United States Patent [19]

Coosmans et al.

[11] Patent Number: 5,013,701

[45] Date of Patent: * May 7, 1991

[54] CATALYST SYSTEM FOR HIGH-TEMPERATURE (CO) POLYMERIZATION OF ETHYLENE

[75] Inventors: Luc M. C. Coosmans, Houthalen, Belgium; Johannes Blenkers, Beek; Jacobus Loontjens, Meerssen, both of Netherlands

[73] Assignee: Stamicarbon, B.V., Geleen, Netherlands

[*] Notice: The portion of the term of this patent subsequent to May 2, 2006 has been disclaimed.

[21] Appl. No.: 336,608

[22] Filed: Apr. 10, 1989

Related U.S. Application Data

[63] Continuation of Ser. No. 154,371, Feb. 10, 1988, abandoned.

[30] Foreign Application Priority Data

Feb. 11, 1987 [NL] Netherlands ............... 8700321

[51] Int. Cl.$^5$ ............................................. C08F 4/685
[52] U.S. Cl. ........................... 502/110; 502/113; 526/116
[58] Field of Search ........................... 502/110, 113

[56] References Cited

U.S. PATENT DOCUMENTS

| | | | |
|---|---|---|---|
| 4,226,964 | 10/1980 | Tanaka et al. | 502/113 X |
| 4,497,906 | 2/1985 | Hanji et al. | 502/113 X |
| 4,612,300 | 9/1986 | Coleman | 502/113 |
| 4,704,376 | 11/1987 | Blenkers et al. | 502/113 X |
| 4,826,794 | 5/1989 | Coosemans et al. | 502/110 |

FOREIGN PATENT DOCUMENTS

| | | |
|---|---|---|
| 0068200 | 1/1983 | European Pat. Off. . |
| 49708 | 5/1981 | Japan ............... 502/113 |
| 77100649 | 3/1982 | Taiwan . |
| 7111813 | 5/1982 | Taiwan . |
| 1187466 | 4/1970 | United Kingdom . |
| 2097413 | 11/1982 | United Kingdom . |

OTHER PUBLICATIONS

European Search Report, Application No. EP-88-2-0-0203.
Dutch Search Report, Application No. 8700321.

*Primary Examiner*—Patrick P. Garvin
*Attorney, Agent, or Firm*—Cushman, Darby & Cushman

[57] ABSTRACT

Catalyst system, suitable for the (co)polymerization of ethylene and optionally minor amounts of 1-alkenes and/or dienes at a temperature of at least 180° C., to be prepared by combining at least two components A and B, which components comprise:

A: one or more titanium compounds, one or more vanadium compounds, one or more aluminium compounds, one or more magnesium compounds and optionally one or more halogen compounds, in such amounts that the atomic ratio of magnesium to the sum of titanium and vanadium is between 0 and 10, the atomic ratio of aluminium to the sum of titanium and vanadium is at least 3, the atomic ratio of aluminium to magnesium is at least 1, and the atomic ratio of halogen to magnesium is at least 2, B: one or more organoaluminium compounds, which two components are, separately or in combination, supplied direct to the polymerization vessel.

23 Claims, No Drawings

CATALYST SYSTEM FOR HIGH-TEMPERATURE (CO) POLYMERIZATION OF ETHYLENE

This is a continuation of application No. 07/154,371, filed Feb. 10, 1988, which was abandoned upon the filing hereof.

The invention relates to a catalyst system for the (co)polymerization of ethylene and optionally minor amounts of 1-alkenes and/or dienes, to the preparation of this catalyst system and to the (co)polymerization of ethylene and optionally minor amounts of 1-alkenes and/or dienes.

There are numerous catalyst systems that are capable of bringing about polymerization of ethylene and/or 1-alkenes. Thus, for instance, so-called Phillips and Ziegler-Natta systems can be distinguished. Of these, a number relate to polymerization in the gas phase. Others are directed at polymerization in the presence of a liquid dispersant. The latter can be subdivided into the so-called suspension system, with polymerization taking place at temperatures below the dissolution temperature of polyethylene, and the so-called solution system, with a polymerization temperature above the dissolution temperature of the polyethylene formed. Solution polymerization requires special catalyst systems as the catalyst activity and the molecular weight of the polymer produced generally decrease with increasing polymerization temperature. It was not until the end of the sixties that a catalyst was developed the activity of which was such as to allow of solution polymerization of ethylene without there being any need to remove catalyst residues from the product (GB-A 1,235,062).

Polymerization generally takes place at temperatures that are only little above the dissolution temperature of polyethylene, because the activity of catalysts customarily applied so far decreases at high polymerization temperatures. At unchanged residence times, this means that the polymer yield decreases, as a result of which the amounts of catalyst residues in the polymer increase and washing out of the polymer soon becomes necessary. A problem in this exothermic polymerization reaction is the dissipation of the heat of polymerization. Cooling through the wall or through cooling devices in the reactor may easily lead to polymer deposition on the cooling surfaces, especially at coolant temperatures below 150° C. For this reason, strong cooling of the reactor feed was preferred. This, however, requires much energy and will become more expensive as fuel prices rise.

Polymerization at high temperatures would have energy advantages also in another respect: not only can the strong cooling of the reactor feed be reduced or even be done without, there also no longer is any need during polymer upgrading to heat the product in order to evaporate the solvent. The reason for this is that the heat of evaporation decreases or even becomes zero as the solution temperature increases and approaches, or even exceeds, the critical temperature of the solvent, and as a result the enthalpy of evaporation becomes minimal.

For the above reasons there is much demand for high-temperature catalysts. These catalysts should be so active as to retain sufficient activity also at very high polymerization temperatures (above 180° C.). Present-day legislation renders it even more difficult to meet this requirement by imposing clear limits as regards the amount of transition metals in products. In addition, the polymer produced is to meet the customary requirements as regards processability and applicability, which implies the molecular weight must be sufficiently high, or the melt index sufficiently low and yet it must have good flow properties.

European patent applications EP-A 58549, published Aug. 8, 1982, and EP-A 132288, published Jan. 30, 1985, describe catalyst systems that are active at very high polymerization temperatures.

EP-A 58549 comprises the combination of two components, the first of which is prepared by reacting a solid reaction product of an organomagnesium compound and a halide with a transition metal compound and an organometal compound and recovering the precipitate thus obtained, and the second of which is an organoaluminum compound. In EP-A 132 288 the first component is obtained by reacting a solid reaction product of an organomagnesium compound and a chlorosilane compound with an electron donor, recovering the precipitate thus obtained and reacting the same with a transition metal compound, and the second component is an organometal compound.

A drawback of these catalysts is that the preparation of the first compound is a laborious affair. In plant polymerizations, streamlining of the process is of prime importance; reactions that take some hours and the recovering of precipitates interfere with this aim. In addition, the precipitate gives rise to problems in dosing the catalyst to the polymerization vessel.

From US-A 4,330,647, likewise, a two-component catalyst is known that is suitable for polymerization at very high temperatures. The first component here is prepared by reacting a reaction product of an organomagnesium compound with a trichloro- or tetrachlorohydrocarbon compound with a transition metal compound. Preparation of this compound also takes hours, which is objectionable in a process to be carried out on plant scale. Here, too, the precipitate, which is not recovered separately, but is supplied to the reactor as a suspension, may give rise to problems in catalyst dosing and clogging of the feed line.

A catalyst system comprising magnesium halide supported titanium and vanadium compounds as a first component and a triethylaluminum as a second component is known from US-A-4,612,300. The first component comprises only a little aluminum, the atomic ratio of aluminum to magnesium not exceeding 0.5, and the atomic ratio of aluminum to the sum of titanium and vanadium is also low. The atomic ratio of the total aluminum present to magnesium is at most 1.05. This catalyst system needs long incubations of the various ingredients in order to be active at 180° C., and its activity deteriorates at higher polymerization temperatures to a degree that catalyst residues must be removed. Also an important drawback of this catalyst system is the need for relatively large amounts of dialkylmagnesium. As dialkylmagnesium compounds are very expensive, the amount of it in a catalyst system in fact determines the costs of the catalyst. Hence the catalyst system of US-A-4,612,300 is expensive.

The invention aims to find a catalyst system that does not have the above-mentioned disadvantages, without sacrificing activity or the capability of forming large polymer molecules at very high polymerization temperatures.

It has, surprisingly, been found that a catalyst system that is a combination of at least two components, A and B, which components comprise:

A: one or more titanium compounds, one or more vanadium compounds, one or more aluminium compounds, one or more magnesium compounds and optionally one or more halogen compounds, in such amounts that the atomic ratio of magnesium to the sum of titanium and vanadium is between 0 and 10, the atomic ratio of aluminium to the sum of titanium and vanadium is at least 3, the atomic ratio of aluminium to magnesium is at least 1, and the atomic ratio of halogen to magnesium is at least 2, B: one or more organoaluminium compounds, which two components are fed, separately or in combination, direct to the reaction vessel, is suitable for (co)polymerization of ethylene and optionally minor amounts of 1-alkenes and/or dienes at very high polymerization temperatures.

An advantage of a catalyst system according to the invention is that very high temperatures can be used to produce polyethylene that meets the customary requirements as regards processability and applicability and that contains such a small amount of catalyst residues that washing out of the product is not necessary.

The catalysts according to the subject invention not only are very active, but also very rapid, so that very short residence times can be used. Short residence times have the great advantage that a small reactor can be used. Thus, in a 5 m$^3$ reactor an annual production of more than 50,000 t can be reached when using the catalyst according to the invention.

With the subject catalysts, residence times of 10 minutes or shorter will suffice. At residence times of 5 minutes the yields still are so high that no washing treatment for catalyst residue removal need be applied.

Yet another advantage is that components A and B are fed direct to the reactor vessel, that is, without further heating, incubations, precipitate recovery and/or other treatments. The residence time of the various ingredients of the catalyst components in the feed lines generally is sufficient for obtaining an active catalyst system. In most cases this residence time will not be longer than some, for instance 5, minutes, and often even less, for instance less than 3 minutes or even less than 1 minute. It is recommended to complete the mixing of the ingredients of the catalyst components once it has been started.

Catalyst systems according to the invention have the highest activity at an atomic ratio of aluminium from component A to the sum of titanium and vanadium of at least 5. It is recommendable for the atomic ratio of magnesium to the sum of titanium and vanadium to be between 0.01 and 5, in particular between 0.02 and 4. A further activity increase is achieved at an atomic ratio of aluminium from component A to magnesium of at least 3, in particular 5. An atomic ratio of halogen to magnesium of at least 4, and in particular at least 6, is recommendable, as is an atomic ratio of aluminium from component B to the sum of titanium and vanadium of at least 3. Furthermore, an atomic ratio of titanium to vanadium of at most 1, and in particular at most 0.8, is to be preferred.

The atomic ratios of aluminium from component A to the sum of titanium and vanadium, and of aluminium from component B to the sum of titanium and vanadium, will generally not exceed 200, and in particular they will not exceed 100. The atomic ratio of aluminium from component A to magnesium will usually be at most 200, in particular at most 100, as will the atomic ratio of halogen to magnesium. The atomic ratio of titanium to vanadium usually is at least 0.001, in particular at least 0.01.

The atomic ratio of aluminium from component B to aluminium from component A that gives the best results depends somewhat on the compositions and amounts of the other catalyst components. In general, a ratio of at least 0.1 and at most 10 is to be preferred, in particular of at least 0.5 and at most 5. An atomic ratio of the total aluminum from components A and B to magnesium of at least 3 and preferably at least 5 is recommended. It will usually not exceed 200. As titanium compounds, both tetra- and trivalent compounds of the general formula $Ti(OR^1)_{4-n}X^1_n$ and $Ti(OR^2)_{3-m}X^2_m$, respectively, where $R^1$ and $R^2$ are equal or different and represent hydrocarbon residues with 1-20 carbon atoms, $X^1$ and $X^2$ halogen atoms, and $0 \leq n \leq 4$ and $0 \leq m \leq 3$, yield good results. Of these compounds, titanic acid esters, such as tetrabutoxytitanium, are to be preferred. Titanium complexes such as, for instance $TiCl_3 \cdot 3$ decanol, TBT . $AlCl_3$, TBT . $0.2$ Cr(acac)$_2$, TBT . x CrO$_3$ and TBT . x diethylzinc ($0 < x < 1$) may also be applied. (See the list of abbreviations on page 13). Compounds such as, e.g., cresyl titanate polymer $(CH_3C_6H_4[Ti(OC_6H_4CH_3)_2O]_a \ OC_6H_4CH_3, a \geq 1)$ can likewise be applied.

As vanadium compounds, use can be made of compounds of the general formula $VO(OR^3)_{3-p}X^3_p$, where $R^3$ represents a hydrocarbon residue with 1-20 carbon atoms, $X^3$ a halogen atom and $0 \leq p \leq 3$, in particular vanadyl chloride and/or vanadyl butoxide. It is also possible to use vanadium compounds of the general formula $VX^4_3$ or $VX^4_4$, where $X^4$ represents a halogen atom. $X^4$ preferably is a chlorine atom. Mixtures of titanium compounds or vanadium compounds can also be used as catalyst ingredients.

The magnesium compounds of component A preferably are organo-magnesium compounds and in particular possess at least one hydrocarbon residue bound to the magnesium atom, preferably an alkyl residue. In particular dialkylmagnesium compounds yield a catalyst system having high activity. The organomagnesium compound may also be complexed with other organometal compounds so as to obtain a product that is soluble in the solvents customarily used in solution polymerization. For this purpose for instance organozinc, organoboron, but especially organoaluminium compounds are suitable. Examples of organomagnesium compounds suitable for component A are ethylbutylmagnesium, dibutylmagnesium, and higher dialkylmagnesium compounds, as well as complexes of, for instance, dibutylmagnesium. ⅓ triethylaluminium and the like, or mixtures thereof. The aluminium compound of component A can be chosen from a large group of compounds. Preference is given to an aluminium compound of the general formule $R^4_qAlX^5_{3-q}$, where the symbols $R^4$ are equal or different and represent a hydrocarbon residue with 1-20 carbon atoms, in particular alkyl, $X^5$ represents a halogen atom, in particular chlorine, and $0 \leq q < 3$. Mixtures can also be applied.

Examples of organoaluminium compounds of component A are: DEAC, MEAC, MMAC, SEAC, SMAC. Particularly DEAC and/or SEAC yield good results. (See the list of abbreviations on page 13). Aluminum compounds in which no halogen is present (like DADHMS, DADS, TEA, TMA, TIBA) can also be used but in that case a halogen, in particular chlorine, containing compound is preferably added. These can be hydrogenchloride, alkyl chlorides, acyl chlorides, aryl chlorides, inorganic chlorides or combinations thereof. The role played by chloride in this complicated catalyst system is not quite clear. A predominant portion of the chlorine atoms may originate from component B, but it has been found that the catalyst yields better results if at least half of the chlorine atoms present originates from component A.

A point to be observed is that the atomic ratio of halogen to magnesium must at least be 2. If use is made of aluminium compounds containing little halogen, in particular trialkylaluminium compounds, it may be necessary to increase the halogen content of component A. This may be done, for instance, by choosing one of the transition metal compounds such that it can serve as halogen source. However, in connection with the freedom of choice in this respect it is to be preferred to add an extra halogen compound. For this reason it is recommendable for component A to also contain one or more chlorides. These are, for instance, alkyl chlorides, acyl chlorides, aryl chlorides, inorganic chlorides or combinations thereof. Preference is given to isopropyl chloride, benzyl chloride and/or chlorides of elements from groups 3a and 4a of the Periodic System (Handbook of Chemistry and Physics, 52nd ed.), in particular $SnCl_4$, $SiCl_4$ and $BCl_3$. An active catalyst that yields a high polymer molecular weight, also at very high polymerization temperatures, is formed also when component A furthermore comprises one or more electron donors (Lewis bases), such as, for instance, DEA, EB, IPA, acetyl acetone and/or MPT. (See the list of abbreviations on page 13).

This electron donor is preferably added together with one of the other compounds, for instance in the form of tetrabutoxytitanium, tetraisopropoxytitanium and/or vanadylbutylate.

The organoaluminium compound of component B may be the same one as that of component A, but this is not necessarily so. A good result is obtained if compounds are applied that have the general formula $R_s^5AlY_{3-s}$, where the symbols $R^5$ are equal or different and represent a hydrocarbon residue with 1-20 carbon atoms, Y a hydrogen atom, a hydrocarbon residue with 1-20 carbon atoms, a group of the general formula $-NR^6$ (where $R^6$ is a hydrocarbon residue with 1-10 carbon atoms), or a group of the general formula $-OR^7$ (where $R^7$ is a hydrocarbon residue with 1-20 carbon atoms or a group of the general formula $-Si(R^8)_3$, where the symbols $R^8$ are equal or different and represent a hydrogen atom and/or a hydrocarbon residue with 1-20 carbon atoms), and $0<s<3$.

Particularly compounds in which oxygen is bonded to aluminum have a good activity. Furthermore, also an alkylaluminoxane (a compound of the general formula $R_2Al-[OAl(R)]_n-OAlR_2$, where the symbols R are equal or different and represent a hydrocarbon residue with 1-10 carbon atoms, and n is larger than or equal to 0) can be applied as component B with good results. Mixtures, too, may yield good results. Examples of organoaluminium compounds of component B are: methylaluminoxane, DADHMS, DADS, DATPS, DEAC, DEAH, DEALOX, IPRA, MEAC, SEAC, TEA, TIBA, TIBAO, DIBBA, TOA. (See the list of abbreviations on page 13.)

A further activity increase is achieved if, besides the organoaluminium compound(s), one or more other metal alkyls are added to component B, such as, for instance, compounds of dialkylmagnesium, dialkylzinc, trialkylboron and alkyllithium. Good results are obtained especially when component B furthermore comprises one or more electron donors (Lewis bases), such as EB, IPA, MPT, decanol, PMHS.

If desired, also a chloride may be added to component B.

Catalyst systems according to the invention may be fed to the reactor separately or in combination. However, a better result is obtained when components A and B are separately fed to the reactor. When components A and B are separately fed to the reactor, it is immaterial in what order this is done. The sequence in which the ingredients of the components themselves are mixed is not very important, either.

As regards component A, however, it is preferred to mix the magnesium compound and the aluminium compound before the titanium and vanadium compounds are added.

Thus, for instance, first an organoaluminiumhalogen compound and an organomagnesium compound can be mixed, then a titanium and a vanadium compound can be added, and finally optionally a chloride and/or an electron donor. It also is possible to first mix an organomagnesium compound with a mixture of a chloride and an organoaluminium, and subsequently with a titanium and a vanadium compound. Likewise, it is possible to add the aluminium compound and the magnesium compound to one of the transition metal compounds before the second transition metal compound is added. It may be preferred to first mix the vanadium and titanium compounds with each other, especially when one of the two is less stable, such as $VOCl_3$.

It is recommendable to effect mixing of the magnesium compound with the aluminium compound and/or the optional halogen compound at a temperature below 125° C., particularly below 75° C., more in particularly below 50° C. The temperature will generally not be below −60° C.

As regards component B, here, too, the mixing sequence, if any, can freely be determined, without this giving rise to any significant decrease in catalyst activity.

It is true for both component A and component B that the absence or presence of monomer(s) during mixing of the catalyst ingredients has little effect on catalyst activity.

It is also possible to feed to a third component to the reactor, besides components A and B. This third component may be a chloride and/or an electron donor, in particular a chloride of aryl or alkyl or an element from groups 3a and 4a of the Periodic System, or an organoaluminium chloride.

The invention also relates to polymers obtained by means of a catalyst according to the invention. These polymers comprise ethylene, one or more 1-alkenes with 3 to 18 carbon atoms, in an amount of 0 to 15 moles % relative to the total polymer, and one or more dienes with at least 7 carbon atoms in an amount of 0 to 10 moles % relative to the total polymer. Good properties are found in particular in polymers in which the dienes contain at least two-conjugated double bonds capable of being polymerized by means of transition metal catalysts and in which the amount of dienes does not exceed 0.1 moles % relative to the total polymer.

Polymers according to the invention may contain the customary additives, such as stabilizers, lubricants, etc., and also, for instance, crosslinking agents and fillers.

Polymers obtained by means of a catalyst according to the invention possess the customary, commercially desirable properties, such as sufficiently high molecular weight (low melt index) and good processability. They can be used for the preparation of cast film and blown film with good mechanical and optical properties, while also the rheological and welding properties meet the normal requirements. The polymers also are suitable for many other customary applications, e.g. injection moulding and rotational moulding.

Polymerization can be effected in a manner known per se, both batchwise and continuously. In general the catalyst components are added in such amounts that the amount of titanium in the polymerization medium is 0.001 to 4 mmole/l, preferably 0.005 to 0.5 mmole/l, and more in particular 0.01 to 0.05 mmole/l.

As dispersant, both in catalyst preparation and in polymerization, use can be made of any liquid that is inert relative to the catalyst system, for instance one or more saturated, straight or branched aliphatic hydrocarbons, such as butanes, pentanes, hexanes, heptanes, pentamethylheptane or petroleum fractions such as light or regular-grade petrol, isopar, naphtha, kerosine, gas oil. Aromatic hydrocarbons, for instance benzene or toluene, are usable, but such solvents will generally not be used in technical scale production, both for cost considerations and for safety considerations. By preference, therefore, as solvent in technical scale polymerizations use is made of the cheap aliphatic hydrocarbons, or mixtures thereof, as marketed by the petrochemical industry. In many cases, pre-treatments of such solvents, for instance drying or purification, are required. This will present no problems whatsoever to the average person skilled in the art. Of course, cyclic hydrocarbons such as cyclohexane and decalin can also be used as solvent.

Polymerization preferably is effected at temperatures above 135° C., particularly above 180° C., and more in particular at temperatures above 200° C. For practical considerations the temperature will generally not exceed 300° C.

The polymer solution obtained upon polymerization can subsequently be upgraded in a way known per se, the catalyst generally being deactivated at some stage of upgrading. Deactivation can be effected in a way known per se. The catalysts according to the present invention have such a high activity that the amount of catalyst in the polymer, notably the transition metal content, is so low that removal of catalyst residues can be done without. Of course the polymer can be subjected to a washing treatment to reduce the residual content of catalyst components even further if this is desired.

Polymerization can be effected at atmospheric pressure but also at elevated pressure, up to about 1000 bar, or at even higher pressures, both in continuous and in discontinuous manner. By polymerizing under pressure, the polymer yield can be increased further, which may contribute to the preparation of a polymer with a very low content of catalyst residues. Polymerization is preferably effected at pressures of 1–200 bar, and more in particularly of 10–100 bar.

Pressures in excess of 100 bar soon give rise to technological objections. However, pressures that are much higher, of 1000 bar and more, can be used if polymerization takes place in so-called high-pressure reactors.

In the subject process, modifications known per se can be applied. Thus, for instance, the molecular weight can be controlled by addition of hydrogen or other modifiers customarily applied for the purpose. Polymerization can also be effected in several stages, connected either in parallel or in series, in which, if desired, differing catalyst compositions, temperatures, residence times, pressures, hydrogen concentrations, etc. are applied. It is, for instance, possible to prepare products with a wide molecular weight distribution by choosing the conditions, for instance pressure, temperature and hydrogen concentration, in one stage such that a polymer with a high molecular weight is formed, while the conditions in another stage are chosen such that a polymer with a lower molecular weight is formed.

The invention will now be elucidated with reference to some examples, without, however, being restricted thereto.

List of abbreviations used:

- Acac = acetylacetonate
- BOM = butyloctylmagnesium
- BzCl = benzyl chloride
- DADHMS = diethylaluminium dihydromethylsiloxide
- DADS = diethylaluminium dimethylethylsiloxide
- DATPS = diethylaluminium triphenylsiloxide
- DBM = dibutylmagnesium
- DEA = diethylamine
- DEAC = diethylaluminium chloride
- DEAH = diethylaluminium hydride
- DEALOX = diethylaluminium methoxide
- DIBAH = diisobutylaluminium hydride
- DIBBA = diisobutyl-1-butenylaluminium
- EB = ethyl benzoate
- EBM = ethylbutylmagnesium
- IPA = isopropyl alcohol
- IPRA = isoprenyl aluminium
- MEAC = monoethylaluminium dichloride
- MMAC = monomethylaluminium dichloride
- MPT = methylparatoluate
- PMHS = polymethyl hydrosiloxane
- SEAC = sesquiethylaluminium chloride (ethyl$_{1,5}$, Cl$_{1,5}$)
- SMAC = sesquimethylaluminium chloride (methyl$_{1,5}$AlCl$_{1,5}$)
- TBOT = tributoxyoleyltitanate
- TBT = tetrabutoxytitanium
- TEA = triethylaluminium
- TFS = triphenylsilanol
- TIBA = triisobutylaluminium
- TIBAO = tetraisobutylaluminoxane
- Ti—O—Ni = nickel, titanium-$\mu$-butoxide, [(BuO)$_3$TiO]$_2$Ni
- TIPT = tetraisopropoxytitanium
- TMA = trimethylaluminium
- TOA = trioctylaluminium
- TPT = triphenylsilanol
- VB = vanadyl butoxide Example I Polymerization experiments were conducted at 180° C. in a one-litre gas-liquid reactor with 500 ml purified and dried pentamethylheptane (PMH) as dispersant and ethylene to a reactor pressure of 8 bar. The ingredients of catalyst component A were separately premixed in PMH during 30 seconds at 25° C. and subsequently the catalyst components A and B were separately pumped into the reactor. Table 1 shows the sequence in which the ingredients of catalyst component A were mixed and the concentrations in which they were present during polymerization (mmole/l). The polymerization time was 10 minutes. The polymer was stabilized, if necessary, dried and weighed. The yield is expressed in g polymer per mmole titanium+vanadium. The activity of the catalyst system is expressed as g PE/mmole (Ti+V) .10 minutes. Exp. no. 3 was carried out at a polymerization temperature of 240° C.

TABLE 1

| Exp. No. | COMPONENT A | COMPONENT B | α |
|---|---|---|---|
| 1 | 0.6 SEAC/0.06 EBM/0.04 TBT/0.06 VOCl$_3$ | 0.04 TEA | 837 |
| 2 | 0.6 SEAC/0.06 EBM/0.04 TBT/0.06 VOCl$_3$ | 0.4 TEA | 1102 |
| 3 | 0.6 SEAC/0.06 EBM/0.04 TBT/0.06 VOCl$_3$ | 0.4 TEA | 622 |

Comparative examples

Preparation of magnesium-slurry.

To 100 ml DBM (a 10 wt. % solution of Magala ® 7.5 E from Texas Alkyls Inc.) 140 ml PMH was added. Anhydrous purified HCl was led through this solution during 80 minutes at a flow rate of 8.9 l/hr. Excess HCl was stripped from the so obtained slurry by purging with dry $N_2$. Two slurry concentrations in PMH were prepared (0.2 M and 0.267 M of Mg), stored under $N_2$ and used in the catalyst compositions.

Comparative example 1

To 100 ml of the 0.2 M Mg-slurry, 1.79 ml of a 3.36 M solution of MEAC was added and this mixture was stirred for at least 8 hours at 25° C. Then 0.47 ml of pure TBT was added and after at least 8 hours stirring at 25° C. 0.14 ml of pure VOCl$_3$. After at least 8 hours stirring 4.4 ml of this mixture was added to PMH followed by addition of 0.54 mmol TEA. The total volume was 60 ml. 50 ml of this mixture were fed to the reactor. The concentrations of the catalyst components (in mmol/l) present during polymerization and the results are indicated in table 2, Exp. nos. 1 and 2. The polymerization conditions were the same as in Ex. I; the temperature of exp no. 1 was 180° C., that of exp. no. 2 240° C.

Comparative example 2

Comparative example 1 was repeated, only this time 10 ml of the 0.267 M Mg-slurry, diluted with 90 ml PMH, was used and 0.715 ml of the MEAC solution Of this mixture 4.4 ml is added to PMH, followed by addition of 0.45 mmol TEA. The total volume was 66 ml. The final concentrations and results are shown in table 2, exp. nos. 3 (180° C.) and 4 (240° C.).

Comparative example 3

Comparative example 1 was repeated, only this time 5 ml of the 0.2 M Mg-slurry, diluted with 45 ml PMH, 0.36 ml of the MEAC solution and 0.24 ml of pure TBT were used. Of this mixture 4.4 ml and then 0.39 mmol TEA were added to a total of 60 ml PMH. The final concentrations and results are listed in table 2, exp. nos 5 (180° C.) and 6 (240° C.).

Comparative example 4

To 25 ml PMH were added 3.36 ml Mg-slurry (0.2 M), 0.67 ml MEAC solution of 0.3 M, 23 ml of a TBT solution 0.02 M, 1.65 ml of a VOCl$_3$ solution of 0.03 M and 2.79 of a TEA solution of 0.15 M in this order, while stirring at 25° C. These catalyst ingredients were mixed without incubations between the additions. After 2 minutes stirring this mixture was fed to the reactor. The polymerization conditions were the same as in ex. I; the temperature was 240° C. The final concentrations and results are shown in table 2, exp. no. 7.

Comparative example 5

Comparative example 4 was repeated, only this time the 2.79 ml TEA (0.15 M) was fed to the reactor separately. Table 2, exp. no. 8.

Comparative Example 6

To 60 ml PMH 1.2 ml of a SEAC solution of 0.3 M and 1.2 ml of a EBM solution of 0.03 M were added. Then 1.2 ml of a TBT solution of 0.02 M was added followed by 1.2 ml of a VOCl$_3$ solution of 0.03 M. Then 1.62 ml of a solution of 0.15 M TEA was added. After each addition the catalyst ingredients were stirred for at least 8 hours at 25° C. 50 ml of this mixture were fed to the reactor. The polymerization conditions were those of Ex. I; the temperature was 240° C. Table 2, exp. no. 9.

TABLE 2

| Exp. No. | COMPONENT A | COMPONENT B | α |
|---|---|---|---|
| 1 | 1.33 Mg/0.40 MEAC/0.09 TBT/0.10 VOCl$_3$ | 0.83 TEA | 708 |
| 2 | 1.33 Mg/0.40 MEAC/0.09 TBT/0.10 VOCl$_3$ | 0.83 TEA | 396 |
| 3 | 0.16 Mg/0.14 MEAC/0.08 TBT/0.09 VOCl$_3$ | 0.61 TEA | 435 |
| 4 | 0.16 Mg/0.14 MEAC/0.08 TBT/0.09 VOCl$_3$ | 0.61 TEA | 121 |
| 5 | 0.13 Mg/0.16 MEAC/0.09 TBT/0.19 VOCl$_3$ | 0.58 TEA | 191 |
| 6 | 0.13 Mg/0.16 MEAC/0.09 TBT/0.19 VOCl$_3$ | 0.58 TEA | 90 |
| 7 | 1.33 Mg/0.40 MEAC/0.09 TBT/0.10 VOCl$_3$ | 0.83 TEA | 445 |
| 8 | 1.33 Mg/0.40 MEAC/0.09 TBT/0.10 VOCl$_3$ | 0.83 TEA | 245 |
| 9 | 0.6 SEAC/0.06 EBM/0.04 TBT/0.06 VOCl$_3$ | 0.41 TEA | <50 |

Example II and comparative example 7

Polymerization experiments were conducted at 240° C. in a one-litre gas-liquid reactor with 500 ml purified and dried pentamethylheptane (PMH) as dispersant and ethylene to a reactor pressure of 17 bar. The ingredients of the catalyst components were separately premixed in PMH during 1 minute at 25° C. and subsequently the catalyst components were separately pumped into the reactor (unless indicated otherwise). Table 3 shows the sequence in which the ingredients of the catalyst components were mixed and the concentrations in which they were present during polymerization (mmole/l). Table 4 is included for the sake of comparison. The polymerization time was 10 minutes. The polymer was stabilized, if necessary, dried and weighed. The yield is expressed in g polymer per mmole titanium+vanadium. The activity of the catalyst system is expressed as g PE/mmole (Ti+V), 10 minutes. The melt index (M.I.) of the polymer, expressed in dg/min, is determined in accordance with ASTM D 1238, cond. E.

10 minutes. The polymer was recovered, optionally stabilized, then dried and weighed. The activity of the catalyst system is expressed as g PE per min. mole

TABLE 3

| Exp. No. | COMPONENT A | COMPONENT B | α | M. I. |
|---|---|---|---|---|
| 1 | 0.6 SEAC/0.06 EBM/0.04 TBT/0.06 VB/0.2 BzCl | 0.4 TEA | 987 | 11 |
| 2[2] | 0.6 SEAC/0.06 EBM/0.04 TBT/0.06 VB/0.2 BzCl | 0.4 TEA | 837 | 21 |
| 3 | 0.6 SEAC/0.06 EBM/0.04 TBT.AlCl$_3$/0.06 VB/0.2 BzCl | 0.4 TEA | 1002 | 13 |
| 4 | 0.6 SEAC/0.06 EBM/0.04 TIPT/0.06 VB/0.2 BzCl | 0.4 TEA | 984 | 8 |
| 5 | 0.6 SEAC/0.06 EBM/0.04 TBOT/0.06 VB/0.2 BzCl | 0.4 TEA | 903 | 7 |
| 6 | 0.6 SEAC/0.06 EBM/0.04 (TBT.0.08 CrO$_3$)/0.06 VB/0.2 BzCl | 0.4 TEA | 864 | 5, 5 |
| 7 | 0.6 SEAC/0.03 EBM/0.04 TBT/0.06 VB/0.2 BzCl | 0.4 TEA | 993 | 4, 6 |
| 8 | 0.6 TEA/0.2 SnCl$_4$/0.06 EBM/0.04 TBT/0.06 VB/0.2 BzCl | 0.4 TEA | 887 | 9, 3 |
| 9 | 0.6 SEAC/0.06 EBM/0.04 TBT/0.06 VB/0.2 BzCl | 0.4 DADS | 1059 | 11 |
| 10 | 0.6 SEAC/0.06 EBM/0.04 TBT.AlCl$_3$/0.06 VB/0.2 BzCl | 0.4 DADS | 1040 | 14 |
| 11 | 0.6 SEAC/0.06 EBM/0.04 TIPT/0.06 VB/0.2 BzCl | 0.4 DADS | 1260 | 8 |
| 12 | 0.6 SEAC/0.03 EBM/0.04 TBT/0.06 VB/0.2 BzCl | 0.4 DADS | 1162 | 7 |
| 13 | 0.6 SEAC/0.06 EBM/0.04 TBT/0.06 VB/0.2 BzCl | 0.4 DADHMS | 1058 | 7, 5 |
| 14 | 0.6 SEAC/0.06 EBM/0.04 TBT.AlC$_3$/0.06 VB/0.2 BzCl | 0.4 DADHMS | 1144 | 4, 6 |
| 15 | 0.6 SEAC/0.06 EBM/0.04 TIPT/0.06 VB/0.2 BzCl | 0.4 DADHMS | 1203 | 7, 5 |
| 16 | 0.6 SEAC/0.06 EBM/0.04 TBT/0.06 VB/0.2 BzCl | 0.4 DATPS | 1080 | 7, 8 |
| 17 | 0.6 SEAC/0.06 EBM/0.04 TBT.AlCl$_3$/0.06 VB/0.2 BzCl | 0.4 DATPS | 1162 | 9, 5 |
| 18 | 0.6 SEAC/0.06 EBM/0.04 TIPT/0.06 VB/0.2 BzCl | 0.4 DATPS | 1080 | 7 |
| 19 | 0.6 SEAC/0.06 EBM/0.04 TBT/0.06 VB/0.2 BzCl | 0.4 DEALOX | 1196 | 9, 4 |
| 20 | 0.6 SEAC/0.06 EBM/0.04 TBT/0.06 VB/0.2 BzCl | 0.4 DEAH | 1029 | 14 |
| 21 | 0.6 SEAC/0.06 EBM/0.04 TBT/0.06 VB/0.2 BzCl | 0.4 TIBAO | 1204 | 16 |
| 22 | 0.6 SEAC/0.06 EBM/0.04 TBT.AlCl$_3$/0.06 VB/0.2 BzCl | 0.4 TIBAO | 1122 | 12 |
| 23[1] | 0.6 SEAC/0.06 EBM/0.04 TBT/0.06 VB/0.2 BzCl | 0.2 DADS/0.2 TIBAO | 1108 | 11 |
| 24 | 0.6 SEAC/0.06 EBM/0.04 TBT/0.06 VB/0.2 BzCl | 0.4 TEA/0.4 decanol | 1090 | 7, 5 |
| 25 | 0.6 SEAC/0.06 EBM/0.04 TBT.AlCl$_3$/0.06 VB/0.2 BzCl | 0.4 TEA/0.4 decanol | 1221 | 13 |
| 26 | 0.6 SEAC/0.06 EBM/0.04 TIPT/0.06 VB/0.2 BzCl | 0.4 TEA/0.4 decanol | 1049 | 5, 5 |
| 27 | 0.6 SEAC/0.06 EBM/0.04 TBT/0.06 VB/0.2 BzCl | 0.4 TEA/0.4 TFS | 1204 | 7, 7 |
| 28 | 0.6 SEAC/0.06 EBM/0.04 TBT/0.06 VB/0.2 BzCl | 0.4 TEA/0.4 o-cresol | 1100 | 7, 5 |
| 29 | 0.6 SEAC/0.06 EBM/0.04 TBT/0.06 VB/0.2 BzCl | 0.4 TEA/0.2 o-cresol | 1023 | 9, 2 |
| 30 | 0.6 SEAC/0.06 EBM/0.04 TBT/0.06 VB/0.2 BzCl | 0.4 TEA/0.4 PMHS | 1283 | 10 |
| 31 | 0.6 SEAC/0.06 EBM/0.04 TBT/0.06 VB/0.2 BzCl | 0.4 DEAH/0.4 TFS | 1030 | 5, 6 |

TABLE 4

| Exp. No. | COMPONENT A | COMPONENT B | α | M. I. |
|---|---|---|---|---|
| 1 | 0.1 SEAC/0.15 EBM/0.04 TBT/0.06 VB/0.2 BzCl | 0.4 TEA | <100 | — |
| 2 | 0.6 TEA/0.06 EBM/0.04 TBT/0.06 VB/0.1 BzCl | 0.4 TEA | <200 | — |
| 3 | 3.0 SEAC/2.0 EBM/0.04 TBT/0.06 VB/0.2 BzCl | 0.4 TEA | <200 | — |
| 4 | 6.0 SEAC/4.0 EBM/0.04 TBT/0.06 VB/0.2 BzCl | 0.4 TEA | <200 | — |

In a double-walled, 2-litre autoclave a number of continuous polymerizations was carried out. To this end, the autoclave was filled entirely with gasoline that had been purified by means of molecular sieves. In an absorber, ethylene and, if desired, hydrogen were dissolved in purified gasoline Copolymerizations were effected by feeding octene-1 to the gasoline stream that contained ethylene and optionally hydrogen. The reactor temperature was set at 220° C. using the autoclave's jacket heating and it was kept at the desired value during polymerization, if necessary by cooling. The reactor pressure was set so that the reactor remained entirely filled with liquid. During the residence time in the feed lines, the ingredients of the catalyst components were premixed. The components A and B were separately pumped into the reactor. The residence time was about ethylene/l. The melt index M.I. of the polymer, expressed in dg/min, was determined according to ASTM D 1238, cond. E. The density (d), expressed in kg/dm$^3$, was measured according to ASTM D 1505.

Example III

Ethylene was fed to the reactor at a rate of 1050 Nl/hr and 1-octene at a rate of 710 g/hr. The gasoline flow rate was 7.9 l/hr. Isopropyl chloride was dosed to the gasoline feed line at a rate of 0.1 mmole/l. Component A was prepared by successively dosing SEAC, EBM, TBT and VB to a separate reactor feed line, in the amounts shown in Table 5. In addition, TEA was dosed through the gasoline feed line as component B. Exp. Nos. 19 and 20 were carried out at 185° C.

TABLE 5

| Exp. No. | COMPONENT A | | | | COMPONENT B | α | M. I. | d |
|---|---|---|---|---|---|---|---|---|
| | SEAC | EBM | TBT | VB | TEA | | | |
| 1 | 0.36 | 0.1 | 0.02 | 0.03 | 0.2 | 893 | 4.7 | 923 |
| 2 | 0.32 | 0.085 | 0.02 | 0.03 | 0.2 | 960 | 3.9 | |
| 3 | 0.32 | 0.05 | 0.02 | 0.03 | 0.2 | 1081 | 3.0 | |
| 4 | 0.32 | 0.03 | 0.02 | 0.03 | 0.2 | 1141 | 2.9 | |
| 5 | 0.32 | 0.025 | 0.02 | 0.03 | 0.2 | 998 | 2.3 | |
| 6 | 0.32 | 0.006 | 0.02 | 0.03 | 0.2 | 998 | 1.5 | |
| 7 | 0.306 | 0.032 | 0.02 | 0.03 | 0.2 | 1141 | 3.1 | |
| 8 | 0.306 | 0.032 | 0.02 | 0.03 | 0.16 | 1233 | 1.8 | |

TABLE 5-continued

| Exp. No. | COMPONENT A | | | | COMPONENT B | | | |
|---|---|---|---|---|---|---|---|---|
| | SEAC | EBM | TBT | VB | TEA | α | M. I. | d |
| 9 | 0.3 | 0.03 | 0.02 | 0.04 | 0.2 | 1129 | 3.3 | |
| 10 | 0.3 | 0.03 | 0.02 | 0.05 | 0.2 | 1348 | 3.7 | |
| 11 | 0.3 | 0.02 | 0.02 | 0.05 | 0.2 | 1707 | 4.9 | |
| 12 | 0.3 | 0.01 | 0.02 | 0.05 | 0.2 | 1876 | 3.9 | |
| 13 | 0.3 | 0.0135 | 0.01 | 0.05 | 0.25 | 1134 | 2.3 | |
| 14 | 0.3 | 0.0135 BOM | 0.01 | 0.05 | 0.25 | 1134 | 2.1 | |
| 15 | 0.245 | 0.02 | 0.01 Ti—O—Ni | 0.05 | 0.25 | 922 | 1.5 | |
| 16[2] | 0.33 | 0.03 | 0.02 | 0.03 | 0.10 | 1114 | 5.1 | |
| 17[2] | 0.33 | 0.03 | 0.01 TBT/ 0.02 TiCl$_4$ | 0.045 | 0.15 | 1129 | 8.4 | |
| 18 | 0.33 | 0.03 EBM/ 0.03 Ipa | 0.02 TiCl$_4$ | 0.03 | 0.2 | 948 | 3.3 | |
| 19 | 0.33 | 0.03 EBM/ 0.03 Ipa | 0.02 TiCl$_4$ | 0.03 | 0.2 | 1324 | | |
| 20 | 0.33 | 0.03 EBM/ 0.03 Ipa | 0.02 TBT | 0.03 | 0.2 | 1298 | | |

Comparative example 8

Example III was repeated in the absence of a vanadium compound. Exp. Nos. 2 and 4 were carried out at 220° C., Exp. Nos. 1 and 3 at 185° C. Table 6.

TABLE 6

| Exp. No. | COMPONENT A | | | COMPONENT B | |
|---|---|---|---|---|---|
| | SEAC | EBM/Ipa | Ti | TEA | α |
| 1 | 0.33 | 0.03/0.03 | 0.02 TiCl$_4$ | 0.2 | 700 |
| 2 | 0.33 | 0.03/0.03 | 0.02 TiCl$_4$ | 0.2 | <50 |
| 3 | 0.33 | 0.03/0.03 | 0.02 TBT | 0.2 | 650 |
| 4 | 0.33 | 0.03/0.03 | 0.02 TBT | 0.2 | <50 |

Example IV

Example III was repeated, now with TOA as component B. Table 7.

TABLE 7

| Exp. No. | COMPONENT A | | | | COMPONENT B | | |
|---|---|---|---|---|---|---|---|
| | SEAC | EBM | TBT | VB | TOA | α | M. I. |
| 1 | 0.306 | 0.032 | 0.02 | 0.03 | 0.08 | 831 | 4.0 |
| 2 | 0.306 | 0.032 | 0.02 | 0.03 | 0.12 | 1020 | 3.9 |
| 3 | 0.306 | 0.032 | 0.02 | 0.03 | 0.14 | 1006 | 3.6 |
| 4 | 0.306 | 0.032 | 0.02 | 0.03 | 0.16 | 1006 | 3.2 |
| 5 | 0.306 | 0.032 | 0.02 | 0.03 | 0.2 | 1092 | 3.3 |
| 6 | 0.26 | 0.032 | 0.02 | 0.03 | 0.2 | 1062 | 3.3 |
| 7 | 0.29 | 0.032 | 0.02 | 0.03 | 0.244 | 1006 | 2.9 |
| 8 | 0.306 | 0.032 | 0.02 | 0.03 | 0.244 | 1092 | 3.0 |

Example V

Example III was repeated, but now with different aluminium compounds in component A and with TIBA as component B. Table 8.

TABLE 8

| Exp. No. | COMPONENT A | | | | COMPONENT B | | |
|---|---|---|---|---|---|---|---|
| | SEAC | EBM | TBT | VB | TIBA | α | M. I. |
| 1 | 0.306 MEAC | 0.032 | 0.02 | 0.03 | 0.2 | 1062 | 2.5 |
| 2 | 0.15 1 MEAC/ 1 TEA | 0.06 | 0.02 | 0.03 | 0.2 | 1141 | 3.2 |
| 3 | 0.301 | 0.0128 | 0.02 | 0.03 | 0.2 | 932 | 2.2 |
| 4 | 0.30 | 0.01 | 0.02 | 0.03 | 0.2 | 910 | 1.9 |
| 5 | 0.30 | 0.007 | 0.02 | 0.03 | 0.2 | 900 | 1.9 |
| 6 | 0.275 | 0.007 | 0.02 | 0.03 | 0.2 | 922 | 2.1 |
| 7 | 0.325 | 0.007 | 0.02 | 0.03 | 0.2 | 1033 | 2.1 |

Example VI

Example V was repeated, but now with different compounds as component B, as indicated in Table 9.

TABLE 9

| Exp. No. | COMPONENT A | | | | COMPONENT B | | |
|---|---|---|---|---|---|---|---|
| | SEAC | EBM | TBT | VB | DIBAH | α | M. I. |
| 1 | 0.35 DEAC | 0.03 | 0.02 | 0.03 | 0.2 DEAC | 1067 | 2.8 |
| 2 | 0.23 | 0.03 | 0.02 | 0.03 | 0.2 1 DEAC/1 TEA | 998 | 3.1 |
| 3 | 0.21 | 0.03 | 0.02 | 0.03 | 0.15 | 925 | 1.9 |

Example VII

Example III was repeated with DEAH as component B. In addition, various reactor temperatures were applied, as shown in Table 10 (in °C.).

TABLE 10

| Exp. No. | COMPONENT A | | | | COMPONENT B | t | α | M. I. |
| --- | --- | --- | --- | --- | --- | --- | --- | --- |
| | SEAC | EBM | TBT | VB | DEAH | | | |
| 1 | 0.45 | 0.03 | 0.02 | 0.03 | 0.2 | 220 | 998 | — |
| 2 | 0.36 | 0.03 | 0.02 | 0.03 | 0.2 | 220 | 1081 | 2.8 |
| 3 | 0.36 | 0.03 | 0.02 | 0.03 | 0.2 | 205 | 1569 | 1.6 |
| 4 | 0.36 | 0.03 | 0.02 | 0.03 | 0.2 | 196 | 1747 | 0.9 |

Example VIII

Example III was repeated with an octene feed rate of 730 g/hr, with BOM was magnesium compound and with DADS as component B. The IpCl feed was also varied. The result is shown in Table 11. The melt index of Exp. No. 25 was determined according to ASTM D 1238, cond. F.

TABLE 11

| Exp. No. | COMPONENT A | | | | COMPONENT B | COMPONENT C | α | M. I. | d |
| --- | --- | --- | --- | --- | --- | --- | --- | --- | --- |
| | SEAC | BOM | TBT | VB | DADS | IpCl | | | |
| 1 | 0.3 | 0.0135 | 0.008 | 0.04 | 0.25 | 0.11 | 1125 | 1.3 | 921 |
| 2 | 0.3 | 0.0135 | 0.008 | 0.024 | 0.25 | 0.08 | 899 | 0.9 | |
| 3 | 0.3 | 0.0135 | 0.0085 | 0.0425 | 0.25 | 0.085 | 1189 | 1.5 | |
| 4 | 0.3 | 0.0135 | 0.01 | 0.05 | 0.25 | 0.1 | 1340 | 1.8 | |
| 5 | 0.3 | 0.0135 | 0.01 | 0.03 | 0.25 | 0.1 | 1250 | 1.5 | |
| 6 | 0.3 | 0.0135 | 0.015 | 0.03 | 0.25 | 0.075 | 1446 | 1.9 | |
| 7 | 0.3 | 0.0135 | 0.02 | 0.04 | 0.25 | 0.1 | 1446 | 2.2 | |
| 8 | 0.3 | 0.0135 | 0.01 | 0.03 | 0.2 | 0.1 | 1189 | 1.6 | |
| 9 | 0.3 | 0.0135 | 0.01 | 0.03 | 0.15 | 0.1 | 970 | 1.6 | |
| 10 | 0.3 | 0.01 | 0.007 | 0.035 | 0.25 | 0.0963 | 1024 | 1.1 | |
| 11 | 0.3 | 0.01 | 0.007 | 0.035 | 0.25 | 0.0963 | 1125 | 1.2 | |
| 12 | 0.27 | 0.01 | 0.007 | 0.035 | 0.25 | 0.0963 | 1038 | 1.2 | |
| 13 | 0.3 | 0.01 | 0.007 | 0.035 | 0.35 | 0.0965 | 1209 | 0.95 | |
| 14 | 0.3 | 0.0 | 0.007 | 0.035 | 0.25 | 0.1 | 1340 | 1.3 | |
| 15 | 0.3 | 0.01 | 0.007 | 0.035 | 0.25 | 0.1 | 1152 | 1.2 | |
| 16 | 0.3 | 0.01 | 0.007 | 0.042 | 0.3 | 0.1 | 1365 | 1.3 | |
| 17 | 0.35 | 0.01 | 0.007 | 0.042 | 0.3 | 0.1 | 1271 | 1.2 | |
| 18 | 0.3 | 0.01 | 0.0063 | 0.0378 | 0.3 | 0.09 | 1152 | 1.2 | |
| 19 | 0.35 | 0.01 | 0.007 | 0.042 | 0.3 | 0.1 | 1152 | 1.3 | |
| 20 | 0.38 | 0.01 | 0.007 | 0.042 | 0.3 | 0.1 | 1189 | 1.0 | |
| 21 | 0.42 | 0.01 | 0.007 | 0.042 | 0.3 | 0.1 | 1024 | 0.9 | |
| 22 | 0.35 | 0.0125 | 0.007 | 0.042 | 0.25 | 0.1 | 996 | 2.1 | |
| 23 | 0.35 | 0.0125 | 0.007 | 0.042 | 0.3 | 0.1 | 1170 | 1.3 | |
| 24 | 0.35 | 0.0125 | 0.007 | 0.042 | 0.35 | 0.1 | 1134 | 1.5 | |
| 25 | 0.2 | 0.01 | 0.007 | 0.040 | 0.3 | 0.1 | 1536 | 45.4 | |

I claim:

1. Catalyst system, suitable for the (co)polymerization of ethylene and optionally minor amounts of 1-alkenes and/or dienes at a temperature of at least 180° C., to be prepared by combining at least two components A and B, which components comprise:

A. one or more titanium compounds, one or more vanadium compounds, one or more aluminum compounds, one or more magnesium compounds and optionally one or more chlorides, the chlorides being selected from the group consisting of alkyl chlorides, acyl chlorides and aryl chlorides, in such amounts that the atomic ratio of magnesium to the sum of titanium and vanadium is between 0 and 10, the atomic ratio of aluminum to the sum of titanium and vanadium is at least 3, the atomic ratio of aluminum to magnesium is at least 1, and the atomic ratio of halogen to magnesium is at least 2, said titanium compound(s) being of the general formula $Ti(OR^1)_{4-n}X^1_n$ and/or $Ti(OR^2)_{3-m}X^2_m$, where the symbols $R^1$ and $R^2$ are equal or different and represent hydrocarbon radicals with 1-20 carbon atoms, $X^1$ and $X^2$ halogen atoms, $0 \leq n \leq 4$ and $0 \leq m \leq 3$, said vanadium compound(s) being of the general formule $VO(OR^3)_{3-p}X^3_p$, where $R^3$ represents a hydrocarbon radical with 1-20 carbon atoms, $X^3$ a halogen atom and $0 \leq p \leq 3$, and/or the compounds of the general formula $VX^4_3$ or $VX^4_4$, where $X^4$ represents a halogen atom, said magnesium compound(s) containing at least one hydrocarbon radical bound to the magnesium atom, said aluminum compound(s) being of the general formula $R^4_qAlX^5_{3-q}$, where the symbols $R^4$ are equal or different and represent a hydrocarbon radical with 1-20 carbon atoms, $X^5$ represents a halogen atom and $0 \leq q \leq 3$, B. one or more organoaluminium compounds, of the general formula $R^5_sAlY_{3-s}$, where the symbols $R^5$ are equal or different and represent a hydrocarbon radical with 1-20 carbon atoms, Y a hydrogen atom, a hydrocarbon radical with 1-20 carbon atoms, a group of the general formula $-NR^6$ (where $R^6$ is a hydrocarbon radical with 1-10 carbon atoms), or a group of the general formula $-OR^7$ (where $R^7$ is a hydrocarbon radical with 1-20 carbon atoms, or a group of the general formula $-Si(R^8)_3$, where the symbols $R^8$ are equal or different and represent a hydrogen atom and/or a hydrocarbon radical with 1-20 carbon atoms), and $0 < s \leq 3$, which two components are, separately or in combination, supplied direct to the polymerization vessel with mixing of the ingredients of the catalyst components for no longer than 5 minutes.

2. Catalyst system to claim 1, characterized in that the atomic ratio of magnesium to the sum of titanium and vanadium is between 0.01 and 5.

3. Catalyst system according to claim 1, characterized in that the atomic ratio of aluminium from component A to the sum of titanium and vanadium is at least 5.

4. Catalyst system according to claim 1, characterized in that in component A the atomic ratio of aluminium to magnesium is at least 3.

5. Catalyst system according to claim 1, characterized in that the atomic ratio of aluminium from component B to aluminium from component A is between 0.1 and 10.

6. Catalyst system according to claim 1, characterized in that the atomic ratio of aluminium from component B to the sum of titanium and vanadium is at least 3.

7. Catalyst system according to claim 1, characterized in that the atomic ratio of titanium to vanadium is lower than or equal to 1.

8. Catalyst system according to claim 1, characterized in that the titanium compound is a titanic acid ester.

9. Catalyst system according to claim 1, characterized in that the titanium compound is tetrabutoxytitanium.

10. Catalyst system according to claim 1, characterized in that the vanadium compound is vanadyl chloride and/or vanadyl butoxide.

11. Catalyst system according to claim 1, characterized in that the magnesium compound is a dialkyl magnesium compound.

12. Catalyst system according to claim 1, characterized in that the organoaluminium compound of component A is sesquiethyl aluminium chloride and/or diethylaluminium chloride.

13. Catalyst systems according to claim 1, characterized in that at least half of the halogen atoms present originates from component A.

14. Catalyst system according to claim 1, characterized in that component A, besides the magnesium, aluminium, titanium and vanadium compounds also comprises one or more halogen compounds.

15. Catalyst system according to claim 1, characterized in that the organoaluminium compound of component B contains aluminium bonded to oxygen.

16. Catalyst system according to claim 1, characterized in that the organoaluminium compound of component B is a dialkyl aluminium alkoxide.

17. Catalyst system according to claim 1, characterized in that the aluminium compound of component B is an alkyl aluminoxane.

18. Catalyst system according to claim 1, characterized in that component B also comprises one or more electron donors.

19. Catalyst system according to claim 1, characterized in that component B comprises, besides the organoaluminium compound, one or more other metal alkyls.

20. Catalyst system according to claim 1, characterized in that of component A the titanium compound is a titanic acid ester, the vanadium compound is a vanadyl alkoxide and/or vanadyl halide, the magnesium compound is an organomagnesium compound, and the organoaluminium compound an alkyl aluminium halide, and that the organoaluminium compound of component B contains aluminium bound to oxygen, and in that also a chloride is present, which is supplied to the reaction vessel before, or simultaneously with, component A.

21. Catalyst system according to claim 20, characterized in that of component A the titanic ester is tetrabutoxytitanium, the vanadyl alkoxide is vanadyl butoxide, the vanadyl halide is vanadyl chloride, the organomagnesium compound is a dialkyl magnesium, the alkyl aluminium halide is diethyl aluminium chloride and/or sesquiethyl aluminium chloride, and in that of component B the organoaluminium compound is alkyl aluminoxane, dialkyl aluminium alkoxide, alkylsiloxalane and/or a mixture of an electron donor with a dialkyl aluminium alkoxide and/or an alkylsiloxalane, and in that the chloride is a chloride or alkyl, acyl, aryl and/or of elements from groups 3a and 4a of the Periodic System.

22. Process for the preparation of a catalyst according to claim 1, characterized in that the magnesium compound and the aluminium compound and the optional halogen compound of compound A are mixed with each other before the titanium and the vanadium compound are added.

23. Catalyst system according to claim 1, wherein the mixing of the ingredients of the catalyst components requires less than 3 minutes.

* * * * *

UNITED STATES PATENT AND TRADEMARK OFFICE
CERTIFICATE OF CORRECTION

PATENT NO. : 5,013,701
DATED : May 7, 1991
INVENTOR(S) : Luc M.C. COOSMANS, Johannes BLENKERS and Jacobus LOONTJENS It is certified that error appears in the above-identified patent and that said Letters Patent is hereby corrected as shown below:

Column 4, line 59, change "$0 \leq q < 3$" to --$0 \leq q \leq 3$--.

Column 5, line 50, change "$0 < s < 3$" to --$0 < s \leq 3$--.

Column 9, lines 11-15, between Table 1 and "Comparative Examples" the following should be inserted:

--Notes in the Tables:

1) component B was first fed to the reactor, then component A
2) components A and B were mixed before being fed to the reactor--.

Column 16, line 66 between "system" and "to" insert --according--.

Column 18, line 32 change "or" to --of--.

Signed and Sealed this

Fifth Day of January, 1993

Attest:

DOUGLAS B. COMER

Attesting Officer

Acting Commissioner of Patents and Trademarks